Sept. 4, 1956     A. DIELS ET AL     2,761,768
CIRCULATION NITRATING APPARATUS
Filed March 18, 1953
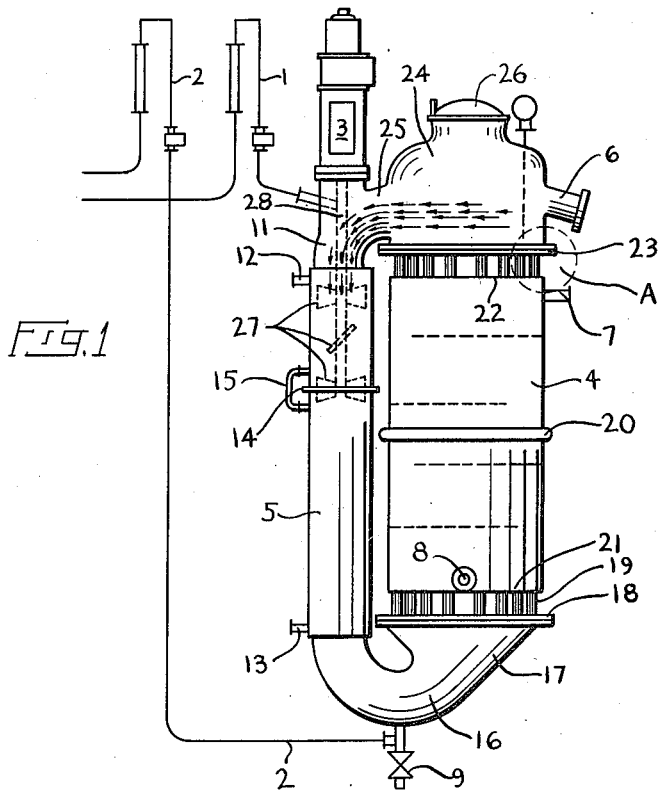
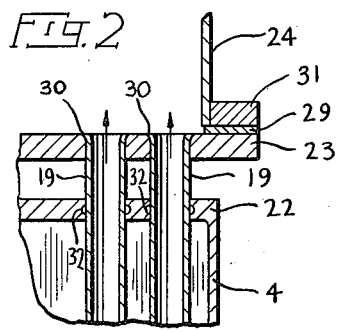
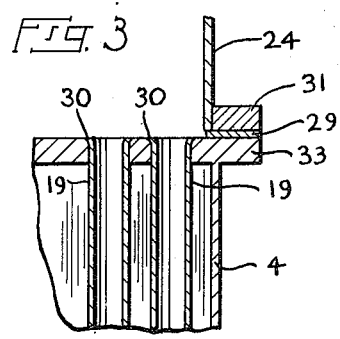
*INVENTORS*
*ALBERT DIELS*
BY *HERMANN ORTH*
Attorney

United States Patent Office 2,761,768
Patented Sept. 4, 1956

2,761,768

CIRCULATION NITRATING APPARATUS

Albert Diels, Brussels, Belgium, and Hermann Orth, Ludwigshafen-Oggersheim, Germany, assignors to Pouderies Reunis de Belgiques, Brussels, Belgium, a corporation of Belgium Application March 18, 1953, Serial No. 343,021

Claims priority, application Germany March 18, 1952

4 Claims. (Cl. 23—266)

This invention relates to a nitrating apparatus, and more particularly to a nitrating apparatus wherein the nitration mixture is continuously circulated while part of said mixture is removed to recover the nitro compounds produced and a corresponding amount of fresh nitration mixture is added to replace said removed nitration mixture. Such an apparatus is particularly suitable for the production of aromatic nitro compounds, such as nitrobenzene, nitrotoluene and the like.

As is known, nitro compounds of this kind are produced by reacting the corresponding hydrocarbons with a nitrating acid composed of concentrated nitric acid and concentrated sulfuric acid. Usually such nitration processes proceed under exothermic conditions, i. e. with the evolution of large amounts of heat which must be removed from the reaction chamber. It is one of the most difficult problems to achieve satisfactory cooling of the reaction chamber. A further very important problem to be solved by the chemical engineer is the problem of eliminating any danger of the cooling medium, usually water, entering the nitrating chamber. It is evident that any access of water to a nitration mixture as used in the chemical industry, will cause the evolution of large amounts of heat within a short period of time and, consequently, will result in serious explosions. Continuous nitration requires large cooling surfaces arranged within a very small space. Regardless whether the cooling surfaces are arranged in tube, coil, or pocket form in the nitrating chamber, there are, by necessity, produced a great number of welded or rolled joints to fasten the cooling elements in and to said chamber. Said welded or rolled joints represent a great danger since they may become defective and leaky. Such defectiveness and leakiness can never be completely avoided even when welding or rolling is effected most conscientiously.

It is one object of the present invention to provide a nitrating apparatus in which the formation of any welded or rolled joints between the cooling elements on the one hand and the actual nitrating chamber on the other hand is avoided and care is taken that, in case the cooling system leaks, the cooling water does not come in contact with the nitration mixture.

Other objects and advantageous features of this invention will become apparent as the description proceeds.

This invention consists, in principle, in providing within the nitrating chamber a double bottom wherein the cooling tubes are fastened by welding or rolling. Such an arrangement is of special importance in the case of nitrating apparatus operating on the principle of circulating the nitration mixture. The most effecticve nitrating apparatus of this type is an apparatus which permits adjustment of the reaction temperature by cooling to the most favorable temperature at any given moment of circulation of the nitration mixture through the nitrating apparatus. This condition is best met by a nitrating apparatus which consists of a set of tubes. In such an apparatus the nitration mixture is subdivided into very small reaction zones. The nitration liquid is passed with a high speed through such an apparatus so that the reaction temperature can be readily controlled and adjusted by cooling. By providing, according to the present invention, a double bottom for fastening said reaction tubes in the nitrating chamber of such a nitrating apparatus and by using cooling tubes of anti-corrosive and acid-resistant material of sufficient wall thickness, it is possible to exclude, for all practical purposes, any connection between nitrating chamber and cooling space.

Since the general construction and many of the details in a circulation apparatus of this general type for continuously nitrating organic compounds and especially aromatic hydrocarbons are well known and are familiar to those skilled in the art and since such apparatus are large and elaborate structures, it is only necessary for an understanding of this invention to illustrate and describe so much of such apparatus as will disclose the present invention. It will be understood that in this disclosure many details of construction, such as supports and mountings of the various parts of the apparatus, pipe lines, driving elements, measuring, feeding, and withdrawing devices etc. are either omitted as unnecessary and as interfering with a consideration of the embodiment of the invention and will be readily supplied by those skilled in the art or are illustrated only diagrammatically.

A practical embodiment of this invention is illustrated in the accompanying drawings without, however, limiting the invention thereto. In these drawings Fig. 1 is a diagrammatic side elevational view of a circulation nitrating apparatus.

Fig. 2 is a cross-sectional view through part of the apparatus of Fig. 1 showing the double bottom and the attachment of the tubes to such double bottom.

Fig. 3 is a cross-sectional view through part of a nitrating apparatus as used heretofore, said apparatus having only a single bottom and showing the attachment of the tubes to said single bottom.

The material to be nitrated, for instance, the liquid hydrocarbon enters the nitrating apparatus through feed pipe line 1. The nitrating apparatus consists of vertical circulating pipe 11 which is provided with cooling jacket 5. The cooling agent is supplied to said cooling jacket 5 through inlet 13 and is discharged through outlet 12. Cooling jacket 5 is welded or in any other suitable manner attached to pipe 11. Said pipe 11 and said cooling jacket 5 consist preferably of two parts which are tightly connected with each other by means of flanges 14. By-pass 15 allows passing of the cooling agent from the lower part of cooling jacket 5 to its upper part. Pipe 11 forms, at its lower end, a U-piece or return bend 16. Opening 17 of said return bend 16 is of funnel shape and is provided with bottom 18 which has a number of holes into which a corresponding number of tubes 19 are inserted and fastened thereto by welding or rolling. Said tubes 19 pass through cooling chamber 4 preferably consisting of an upper and a lower part which are connected with each other by flanges 20. Said cooling chamber 4 is provided with lower bottom 21 and upper bottom 22. Said lower bottom 21 together with bottom 18 of return bend 16 forms the lower double bottom according to the present invention. Bottom 21 is provided with holes corresponding to tubes 19 fastened to bottom 18. Said lower bottom 21 is welded to each of the tubes 19 passing therethrough. Tubes 19 extend throughout the entire length of cooling chamber 4 and a certain distance outwardly thereof. They pass through corresponding holes in upper bottom 22 of cooling chamber 4. Said upper bottom 22 is also welded to each of the tubes 19 passing therethrough. Lower bottom 21 and upper bottom 22 of cooling chamber 4 may, of course, be fastened to tubes 19 in any other suitable manner. Cooling medium, preferably water, is supplied to cooling chamber 4 through inlet 8 and is discharged therefrom through outlet 7. The tubes 19 extending through bottom 22 are passed through holes in bottom 23 of dome-shaped upper part 24 of the circulation nitrating apparatus. Tubes 19 are welded or rolled into said bottom 23 and are, thus, tightly connected therewith. Bottom 23 and upper bottom 22 of cooling chamber 4 form also a double bottom according to this invention. Dome-shaped part 24 is provided with manhole 26 and overflow 6 and is connected with vertical pipe 11 by connecting pipe 25. Pipe line 2 supplies the nitrating acid to the bottom of the nitrating apparatus. Outlet branch 9 with valve is also provided at the bottom of said apparatus. The circle A at the upper right side of the apparatus indicates that part of the upper double bottom with inserted tubes which is illustrated in cross-sectional view in Fig. 2. Circulating pipe 11 may be provided, as shown in Fig. 1, with circulating pump 3 to shaft 28 of which propeller blades 27 are attached. Said propeller blades are designed in such a manner that they exert a downwardly directed force and are, for instance, of the type of propeller blades in Kaplan-turbines or of screw propellers of ships. Any other suitable device to accelerate circulation of the nitration mixture, such as turbines, stirring devices, centrifugal pumps and others may, of course, also be used.

Fig. 2 illustrates, on an enlarged scale, that part of the nitrating apparatus which is indicated by circle A in Fig. 1. Tubes 19 are welded to or rolled into bottom 23 of dome-shaped part 24 of the nitrating apparatus. It is evident that in case welded or rolled joints 30 become defective and leaky, the nitration mixture leaking therethrough will not come in contact with the cooling water present in cooling chamber 4 but will be prevented from contact therewith by the second bottom 22 forming the top of cooling chamber 4. Likewise, in case joints 32 between tubes 19 and second bottom 22 become defective and leaky, the cooling medium leaking therethrough will not come in contact with the nitration mixture present in tubes 19 and dome-shaped part 24 of the nitrating apparatus but will be prevented from contact therewith by first bottom 23 forming the bottom of dome-shaped part 24. Even if both joints 30 and 32 start to leak, there is no danger that the cooling water will enter the actual nitrating chamber and will generate heat. Dome-shaped part 24 is fastened in any suitable manner to bottom 23 by means of flange 31 and packing 29.

Fig. 3 illustrates the difference between a double bottomed circulation nitrating apparatus according to this invention and the heretofore used circulation nitrating apparatus. Tubes 19 are directly fastened, by welding or rolling, to bottom 33 of dome-shaped part 24 of the nitrating apparatus. Said part 24 is connected in any suitable manner with bottom 33 by means of flange 31 and packing 29. Bottom 33 forms also the top of cooling chamber 4. It is evident that any defective welded or rolled joint 30 will allow the cooling water to directly enter dome-shaped part 24 of the nitrating apparatus and, consequently, the nitration mixture and that, vice versa, the nitration mixture may directly enter cooling chamber 4. The large amounts of heat generated on mixing cooling water with nitrating acid will at least cause heating the nitration mixture to a temperature which will change the entire course of the reaction and might even give rise to serious explosions. All these dangers are avoided by working in the double bottomed circulation nitrating apparatus according to this invention.

The present invention is used with great success in nitrating apparatus wherein the actual nitrating chamber consists, as shown in Fig. 1, of a set of a large number of tubes of comparatively small diameter. It is, in general, not advisable to use a single reaction tube of considerably larger diameter, first, because it is rather difficult to properly weld or roll such a large tube into a double bottom and, second, because properly cooling such a tube of large diameter will not be possible. Therefore, as illustrated in Fig. 1, such large central tube is arranged outside the actual nitrating chamber and serves for circulating the nitration mixture. This circulating tube may, of course, also be cooled internally and may be made of several reaction tubes inserted into upper and lower double bottoms like that part of the apparatus shown at the right side in Fig. 1.

Nitration in an apparatus according to the present invention may, for instance, be carried out in the following manner:

225 kg. of toluene per hour are introduced through feed pipe 1 into the nitrating apparatus. The toluene is conducted in downward direction through cooled circulation pipe 11. At the bottom of the apparatus it is mixed with 292 kg. of nitrating acid per hour and passes as such mixture in upward direction through tubes 19 which are cooled in cooling chamber 4. The nitrating acid has preferably the following composition: 56% of nitric acid, 42% of sulfuric acid and 2% of water. About 522 kg. of said nitration mixture per hour are withdrawn through overflow 6 and are worked up separately to yield 230 kg. of mono nitro toluene per hour. The remaining nitration mixture is forced by the action of circulation pump 3 into circulating pipe 11 where it is continuously fed with further amounts of toluene and nitrating acid at the rate indicated above. To cool such a nitration mixture satisfactorily, 85 tubes 19, each of an internal diameter of 28 mm., are provided in cooling chamber 4 and are fastened to the upper and lower double bottom as described above. Cooling chamber 4 has a diameter of 550 mm. while the diameter of circulation pipe 11 is 280 mm. The cross-section of said circulation pipe 11 is preferably the same or somewhat larger than the total cross-section of said tubes 19. The speed of the nitration mixture in tubes 19 is between about 3 m. per second and about 6 m. per second.

Of course, many changes and variations in the arrangement of the double bottoms within said nitrating apparatus, in the fastening of the reaction tubes to said double bottoms, in the construction and design of the apparatus, in other details thereof, and the like may be made by those skilled in the art in accordance with the principles set forth herein and in the claims annexed hereto.

We claim:

1. Apparatus for continuous nitration of organic substances comprising a vertical circulating pipe of relatively large diameter, an impeller therein for causing liquid to flow downwardly therein, means for introducing organic substances and nitrating acid into the upper part of said pipe, a jacket for cooling fluid about said pipe, a vertical cooling chamber adjacent to said pipe, a connection for the flow of liquid from the top of said chamber to the upper part of said pipe and a connection for the flow of liquid from the lower end of said pipe to the lower end of said chamber, an overflow in said top connection for nitrated substances, said chamber consisting of a plurality of parallel vertical tubes of relatively small diameter, a jacket for cooling fluid about said plurality of tubes, the ends of said tubes extending beyond said jacket and opening into the upper and lower sections of said vertical circulating pipe respectively.

2. Apparatus for continuous nitration of organic substances comprising a vertical circulating pipe of relatively large diameter, an impeller therein for causing liquid to flow downwardly therein, means for introducing organic substances and nitrating acid into the upper part of said pipe, a jacket for cooling fluid about said pipe, a vertical cooling chamber adjacent to said pipe, a connection for the flow of liquid from the top of said chamber to the upper part of said pipe and a connection for the flow of liquid from the lower end of said pipe to the lower end of said chamber, an overflow in said top connection for nitrated substances, said chamber consisting of a plurality of parallel vertical tubes of relatively small diameter, a jacket for cooling fluid about said plurality of tubes, the ends of said tubes extending beyond said jacket and opening into the upper and lower sections of said vertical circulating pipe respectively, said chamber jacket having top and bottom members, said tubes passing through openings in said members and means for sealing said tubes into said openings of said members, the tops and bottoms end portions of said tubes being exposed to the atmosphere whereby leaks of cooling fluid from said jacket may be detected.

3. Apparatus according to claim 2 in which said pipe jacket is transversely split, flanges on the adjacent sections of said pipe jacket for connecting said sections together, and a by-pass connection between the parts of said split jacket.

4. Apparatus according to claim 2 in which said chamber jacket is transversely split, flanges on the adjacent sections of said chamber jacket for connecting said sections together.

References Cited in the file of this patent

UNITED STATES PATENTS

| | | |
|---|---|---|
| 1,312,119 | Hough | Aug. 5, 1919 |
| 1,693,786 | Isaachsen | Dec. 4, 1928 |
| 1,809,915 | Smith | June 16, 1931 |
| 2,112,989 | Helle et al. | Apr. 5, 1938 |
| 2,194,666 | Meissner | Mar. 26, 1940 |
| 2,474,592 | Palmer | June 28, 1949 |
| 2,658,728 | Evans | Nov. 10, 1953 |